(12) United States Patent
Schalyo

(10) Patent No.: US 12,015,263 B2
(45) Date of Patent: Jun. 18, 2024

(54) METHOD FOR OPERATING A TAILGATE OF A MOTOR VEHICLE

(71) Applicant: Brose Fahrzeugteile SE & Co. Kommanditgesellschaft, Bamberg, Bamberg (DE)

(72) Inventor: Heino Schalyo, Altendorf (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 361 days.

(21) Appl. No.: 17/575,287

(22) Filed: Jan. 13, 2022

(65) Prior Publication Data

US 2022/0220792 A1 Jul. 14, 2022

(30) Foreign Application Priority Data

Jan. 13, 2021 (DE) .................... 10 2021 200 269.2

(51) Int. Cl.
*H02H 7/085* (2006.01)
*E05F 15/611* (2015.01)
*H02P 29/40* (2016.01)

(52) U.S. Cl.
CPC .......... *H02H 7/0851* (2013.01); *E05F 15/611* (2015.01); *E05Y 2201/434* (2013.01); *E05Y 2400/30* (2013.01); *E05Y 2400/44* (2013.01); *E05Y 2900/544* (2013.01); *H02P 29/40* (2016.02)

(58) Field of Classification Search
CPC ...... H02H 7/0851; E05F 15/611; E05F 15/73; E05F 15/40; E05F 15/616; H02P 29/40; E05D 7/10; E05Y 2201/434; E05Y 2400/30; E05Y 2400/36; E05Y 2400/44; E05Y 2400/50; E05Y 2400/54; E05Y 2400/502; E05Y 2900/544; E05Y 15/73
See application file for complete search history.

(56) References Cited

U.S. PATENT DOCUMENTS

| | | | | |
|---|---|---|---|---|
| 4,117,408 A | * | 9/1978 | Comstedt | H02P 29/40 327/4 |
| 11,161,555 B2 | * | 11/2021 | Banks, Jr. | E05F 15/60 |
| 2007/0132264 A1 | * | 6/2007 | Koneval | B62D 33/0273 296/57.1 |
| 2008/0054667 A1 | * | 3/2008 | Ohly | B62D 33/0273 296/57.1 |
| 2008/0100085 A1 | * | 5/2008 | Ohly | B62D 33/0273 296/57.1 |
| 2013/0060403 A1 | * | 3/2013 | Kerr | E05F 15/627 701/2 |
| 2014/0324251 A1 | * | 10/2014 | Hansen | E05F 15/63 296/57.1 |

(Continued)

FOREIGN PATENT DOCUMENTS

| | | | | |
|---|---|---|---|---|
| CA | 2798237 A1 | * | 6/2014 | .......... B62D 33/027 |
| DE | 102015113914 A1 | * | 2/2016 | .............. E05F 15/43 |

(Continued)

*Primary Examiner* — Lori Lyjak
(74) *Attorney, Agent, or Firm* — Muncy, Geissler, Olds & Lowe, P.C.

(57) ABSTRACT

A method for operating a tailgate of a motor vehicle, in particular a pickup, which is driven by means of an electric motor and delimits a cargo area. A disassembled state is detected, and energization of the electric motor is inhibited. Furthermore, the invention relates to a motor vehicle.

9 Claims, 1 Drawing Sheet

(56) References Cited

U.S. PATENT DOCUMENTS

| | | | |
|---|---|---|---|
| 2015/0315837 A1 | 11/2015 | Salmon et al. | |
| 2017/0274869 A1* | 9/2017 | Da Deppo | B60R 25/00 |
| 2018/0313117 A1* | 11/2018 | Whitham | E05B 81/54 |
| 2020/0047821 A1* | 2/2020 | Santana | E05F 15/614 |
| 2020/0190887 A1* | 6/2020 | Gerken | B62D 33/0273 |
| 2020/0378170 A1* | 12/2020 | Kerr | E05F 15/63 |
| 2021/0301577 A1* | 9/2021 | Nagase | E05F 1/1058 |

FOREIGN PATENT DOCUMENTS

| | | | | |
|---|---|---|---|---|
| DE | 202018101003 U1 * | 5/2018 | | B62D 33/03 |
| DE | 102019102989 A1 * | 8/2019 | | B60R 16/0231 |
| JP | 2019082025 A * | 5/2019 | | B60J 5/10 |
| WO | WO-2019178196 A1 * | 9/2019 | | |

* cited by examiner

METHOD FOR OPERATING A TAILGATE OF A MOTOR VEHICLE

This nonprovisional application claims priority under 35 U.S.C. § 119(a) to German Patent Application No. 10 2021 200 269.2, which was filed in Germany on Jan. 13, 2021, and which is herein incorporated by reference.

BACKGROUND OF THE INVENTION

Field of the Invention

The present invention relates to a method for operating a tailgate of a motor vehicle driven by means of an electric motor, by means of which a cargo area is limited. The invention further relates to a motor vehicle. The motor vehicle is in each case preferably a pickup truck.

Description of the Background Art

Motor vehicles are generally used for the transportation of both passengers and goods. If the motor vehicle is mainly used to transport a comparatively large number of people, the motor vehicle used is generally a bus. If, on the other hand, the motor vehicle is to be used mainly for transporting goods, the motor vehicle is usually designed as a truck. To provide individual mobility, the motor vehicle is usually designed as a passenger car. This has an interior, which serves to accommodate persons. Furthermore, there is usually an additional luggage compartment in which objects can be stored. However, the maximum length of the objects is limited due to the size of the passenger car.

If both people and comparatively bulky goods are to be transported by means of the motor vehicle, a so-called pickup truck, also known as a light-duty truck, is used. This can also be used for transporting goods if other trucks have too little off-road capability or are too large for the chosen transport route.

Pickups of this type usually have an open cargo area. To secure the goods on the cargo area, it is usually bordered at the edges. To facilitate loading and unloading, one of the ends of the cargo area is usually delimited by a tailgate that is pivotably attached to the body of the pickup. In most cases, the tailgate is located at the rear end of the cargo area in the longitudinal direction. It is also possible, with the tailgate open, to position goods on the cargo area that protrude longitudinally rearward beyond the motor vehicle. However, in this case, the length of the motor vehicle is increased, and it may not be possible to access a trailer hitch or the like of the motor vehicle. To make this possible, the tailgate can be removed prior to loading.

SUMMARY OF THE INVENTION

It is therefore an object of the present invention to provide a particularly suitable method for operating a tailgate of a motor vehicle driven by means of an electric motor, and a particularly suitable motor vehicle, wherein advantageously safety and/or comfort is increased.

The tailgate is a component of a motor vehicle that has a cargo area. The cargo area is, for example, open and delimited by means of a tailgate, in particular on one side. Preferably, the cargo area is substantially rectangular, and by means of the tailgate the cargo area is limited at the rear end in the longitudinal direction of the motor vehicle. At the remaining sides, the cargo area is preferably rigidly delimited, in particular by means of the body of the motor vehicle. The tailgate, on the other hand, is expediently pivotably articulated to a further component of the motor vehicle, in particular the body, so that the tailgate can be pivoted. Preferably, in this case, the tailgate is attached to the body at its vertically lower end, and when the tailgate is pivoted into a horizontal position, the tailgate is preferably flush with the cargo area, so that loading and unloading of goods onto the cargo area is simplified. On the other hand, when the tailgate is pivoted into the vertical position, the cargo area is preferably closed all the way around at the edges.

For example, the tailgate is at least partially made of a metal, which increases robustness. In particular, the tailgate is lined with plastic on at least one side, preferably on the side facing the cargo area, so that damage to goods is avoided.

In particular, the motor vehicle is land-based, and is expediently substantially freely positionable on a roadway, and thus not rail-bound. For example, the motor vehicle is a commercial motor vehicle, such as a truck or bus. Alternatively, the motor vehicle is a passenger vehicle (automobile). Preferably, the motor vehicle is a pickup truck, in particular a light-duty commercial vehicle, also referred to as a light-duty truck. The motor vehicle may comprise a driver's cab in which a maximum of two or three persons can be accommodated. Alternatively, the driver's cab can have a further row of seats so that, for example, a maximum of five persons can be transported in the driver's cab.

The tailgate is driven by means of an electric motor so that when the electric motor is energized, the tailgate is pivoted, in particular from a closed to an open position and/or vice versa. It is also possible for the tailgate to assume intermediate positions by means of corresponding energization of the electric motor. The electric motor is energized, for example, as a function of an adjustment request, which is generated automatically or as a function of a user request. The user request suitably corresponds to the actuation of an input device, such as in particular a switch.

The electric motor can be a brushed commutator motor or, suitably, a brushless DC motor (BLDC). In particular, another component is driven by means of the electric motor, such as a gearbox and/or a shaft, which acts on the tailgate. Suitably, the tailgate as well as the electric motor and any components mechanically arranged therebetween are components of a tailgate actuator.

The method provides that a disassembled state of the tailgate is detected. In the disassembled state, for example, the tailgate is completely detached from the motor vehicle and thus completely spaced apart from it. Alternatively, only part of the mechanical coupling of the tailgate is detached from the motor vehicle, i.e., in a preliminary stage of total detachment. When the tailgate is completely detached from the motor vehicle, it is also possible to transport goods that cannot be loaded with the tailgate in place. In the disassembled state, due to the decoupling, no pivoting of the tailgate relative to the potential body of the motor vehicle takes place when the electric motor is energized. However, it is possible that any other components of the flap drive are driven when the electric motor is energized.

When the disassembled state has been detected, energization of the electric motor is blocked. Thus, even when there is an adjustment request, the electric motor is prevented from being energized, so that further components of the motor vehicle, such as in particular further components of the tailgate actuator, are not driven by means of the electric motor.

In this method, manual pivoting of the tailgate is thus not necessary, which increases convenience. Since the tailgate can also be removed from the motor vehicle, it is possible to transport a wide variety of goods and also to use the motor vehicle in different ways, so that operational readiness and flexibility are increased. Furthermore, since no further components can be adjusted by means of the electric motor once the disassembled state has been detected, objects such as items or a person's extremities cannot be trapped by the electric motor, which increases safety.

The tailgate drive may additionally comprise anti-trap protection by means of which, when the tailgate is adjusted, i.e., when the disassembled state is not present, it is ensured that no object is trapped by means of the tailgate, in particular between the tailgate and the potential car body. The anti-trap protection preferably comprises a sensor suitable for this purpose, such as a capacitive sensor, an optical sensor, or a radar sensor.

For example, first, an adjustment request is detected, and the electric motor is energized according to the adjustment request for the adjustment. The adjustment request specifies in particular that the tailgate is to be moved to the open and/or closed position. If the disassembled state is not present, the electric motor is suitably energized in accordance with the adjustment request or at least until the tailgate is in the desired position. The adjustment request is generated, for example, by means of an input device by a user or by an on-board computer, in particular as a function of the current requirements.

An electric voltage is preferably applied to the electric motor to energize it. In particular, the electric motor is operated in a controlled manner and suitably controlled to a preset electrical voltage or, especially preferably, to a preset speed so that the tailgate is always pivoted according to a preset speed.

Furthermore, a value is recorded that characterizes the force applied by means of the electric motor. In other words, in particular the power which the electric motor is currently delivering, or a power consumption, is checked. The characteristic value is compared with an expected value. The expected value is, for example, fixed or adapted to current requirements/conditions, for example the current position of the tailgate and/or the motor vehicle. For example, the expected value is recalculated each time the method is performed and/or as a function of the current position of the tailgate. Preferably, an "artificial intelligence" algorithm or other neural network is used for this purpose. Alternatively, the expected value is stored in a table or a characteristic diagram as a function of certain parameters, such as current requirements/conditions.

If there is a deviation between the expected value and the detected characteristic value that is greater than a limit value, the disassembled state is detected. For example, the deviation is determined unsigned. Preferably, however, the disassembled state is only detected if the expected value is greater than the detected (characteristic) value.

The limit value is, for example, 0 ("zero") or, particularly preferably, greater than 0 ("zero"), so that tolerance compensation and/or compensation for current conditions, for example certain ambient temperatures, are taken into account. Alternatively, or in combination, these are taken into account when determining the expected value.

If the electric motor does not act on the tailgate when it is energized, the force applied by the electric motor is reduced as compared to the force required to drive the tailgate. Thus, if the difference between them is greater than the limit value adjusted to this, the electric motor will not drive the tailgate despite being energized. This is the case when the tailgate is at least partially disassembled.

After the disassembled state has been detected, the power supply to the electric motor is interrupted and the motor is thus stopped. As a result, it is no longer possible to drive components coupled to the electric motor, such as the gearbox. In particular, the interruption is active until a further input is made, the tailgate is mounted again, or another condition is present.

In summary, the electric motor is first energized to detect the disassembled state. When this has been detected, the electric motor is inhibited and thus stopped. Due to the use of the value characterizing the applied force, accuracy in determining the disassembled state is increased. In this way, it is also possible to additionally determine any other malfunction, for example breakage of a component of the tailgate actuator, which could also lead to injury or damage to other components.

For example, the force applied by means of the electric motor is measured directly and this is used as the characteristic value that is detected. Particularly preferably, however, the electric current conducted by means of the electric motor is detected and this is used as the value, which is detected, and which characterizes the force applied by means of the electric motor. The electric current is in particular functionally related to the torque applied by means of the electric motor, which corresponds to the force applied by means of the electric motor. Thus, by means of the electric current, a statement about the applied force is possible. In addition, it is possible for the electric current to improve the control of the electric motor in normal operation, so that by means of a suitable current sensor, for example a shunt, two functions can be carried out, which is why manufacturing costs are reduced. It is also possible to use a current sensor of this type to detect any other jamming.

For example, the comparison is carried out essentially immediately after the start of energization of the electric motor. Particularly preferably, however, the comparison is not carried out until a certain period of time after the start of energization of the electric motor. Thus, any transient effects or static friction that must be overcome to pivot the tailgate are not taken into account in the comparison, which is why incorrect detection of the disassembled state is avoided. Also, after the time period, in particular any tolerance and/or gap compensation is overcome, during which the force to be applied or that has been applied by means of the electric motor is reduced.

The time period can be fixed and, for example, 1 second, 0.5 seconds or 0.1 second. Alternatively, the time period is determined as a function of other variables. In particular, an angle by which the tailgate has been pivoted is used as such a variable. In other words, the time period is determined such that the tailgate would be pivoted by a certain angle in the time period if the tailgate were properly coupled to the electric motor. The angle is conveniently between 4° and 10°. In this case, the static friction/gap compensation/tolerance compensation would be overcome, wherein due to the comparatively small angle, no serious injury to a person would yet occur if the tailgate were mechanically disengaged from the electric motor.

Alternatively, or in combination with this, a manual adjustment of the tailgate in accordance with a given default is detected. If this is done, the disassembled state is detected. During the manual adjustment in accordance with the preset, a mechanical coupling/locking of the tailgate with other components of the motor vehicle, preferably the body, is expediently also released. In other words, when the tailgate is moved according to the preset, the user is disassembling the tailgate. Here, the preset is chosen in particular arbitrarily or in such a way that this is probably not carried out in normal operation. Thus, the manual adjustment of the tailgate is only carried out for disassembly, so that the disassembled state can be reliably detected in this case.

For example, moving the tailgate to a specific position is used as the preset. Alternatively, the preset corresponds to pivoting the tailgate first to a specific position, for example to the 45° open position, and then pivoting back to a further position, preferably by a smaller angle, such as 5°. In this way, on the one hand, a mechanical release of the possible locking of the tailgate is also feasible. On the other hand, such a preset is not carried out during normal operation, so that the disassembled state can be comparatively reliably detected. Since the disassembled state is detected when the user has already pivoted the tailgate to a position suitable for disassembly in accordance with the preset, no special input is required by the user, and the reliability of the detection of the disassembled state is increased.

Alternatively, or in combination with this, the disassembled state is detected after a user input is recorded. In particular, a switch is actuated by the user for this purpose, or the user input is generated by an on-board computer. In particular, the user input corresponds to a desire to remove the tailgate, for example due to a new intended use of the motor vehicle or for maintenance of the motor vehicle. For example, the user input is performed by a repair shop or during a repair shop visit.

For example, the electric motor is disabled directly after the user input is recorded, so that only manual adjustment of the tailgate is possible. Alternatively, the electric motor is first energized so that the tailgate is moved to a disassembly position. In particular, only in the disassembly position is it possible to remove the tailgate from the other components of the motor vehicle, especially the body. Suitably, in the disassembly position, a mechanical block/locking mechanism/coupling between the tailgate and the body is released so that the tailgate can be removed from the body. After the tailgate has been moved to the disassembly position, the disassembled state is detected and thus the electric motor is disabled. As a result, when the user input is performed, except for the removal of the tailgate from the body of the motor vehicle, the user is not required to perform any further mechanical operations, so that convenience is increased. At the same time, when the tailgate is removed manually, it is ensured that no injury to the person occurs, and safety is consequently enhanced.

Particularly preferably, a rotation of the electric motor is monitored in the disassembled state. The rotation of the electric motor is caused in particular by external forces, for example when the tailgate is removed from the vehicle body or with an unintentional movement by the user. It is also possible that the electric motor is rotated unintentionally after the tailgate has been removed due to other use of the motor vehicle.

When an assembly request is detected, the electric motor is energized to assume the position at the start of the disassembled state. The assembly request is entered, for example, by means of a switch or the like. Consequently, the electric motor is brought back to the position it was in when the tailgate was removed, so that the tailgate can be mounted in the same position it was in when it was removed. As a result, the user does not need to perform a complicated alignment of the tailgate or determine the current position of the electric motor, which increases convenience.

In summary, after the start of the assembly request, the tailgate actuator, with the exception of the removed tailgate, is in the state in which it is easier to mount the tailgate. If no rotation of the electric motor has been detected after the start of the disassembled state until the detection of the assembly request, no current is supplied to the electric motor. In particular, the blocking of the electric motor is cancelled when the assembly request is detected. Particularly preferably, however, after the electric motor has been brought into position at the start of the disassembled state, the electric motor is again blocked so that an object is prevented from being trapped by the tailgate and/or the electric motor during the mounting process. Only when the tailgate is fully installed is the blocking suitably removed in this case.

In an alternative, the rotation of the electric motor is always monitored in the disassembled state and the electric motor is controlled essentially immediately in such a way that this is compensated for, i.e., the electric motor is always turned back. As a result, any gap or the like that is formed by means of the tailgate actuator is always the same, so that even in the disassembled state, i.e., before the start of the assembly request, unintentional jamming or snagging is prevented.

The motor vehicle is preferably land-based and has a cargo area that is delimited by means of a tailgate. The cargo area is suitably open or covered, for example, by means of a further cover. Preferably, the motor vehicle is a pickup truck, i.e., in particular a light-duty truck. The tailgate is actuated by means of an electric motor so that it can be moved from an open to a closed position/state and/or vice versa.

The tailgate is operated according to a method in which a disassembled state is detected and subsequently, energization of the electric motor is inhibited. In other words, the electric motor is disabled when the disassembled state has been detected. Preferably, the motor vehicle comprises a control unit which is suitable, in particular provided and arranged, for carrying out the method. In particular, the control device is a component of a tailgate actuator comprising the electric motor as well as the tailgate. The control device has, for example, an application-specific circuit (ASIC) and/or a microprocessor which is suitably designed to be programmable. Preferably, in this case, the microprocessor is embodied by a computer, and the control device preferably comprises a memory on which is stored a computer program (product) containing instructions which, when executed by the computer, cause it to carry out the method.

In particular, the invention also relates to such a computer program product and to a storage medium on which such a computer program is stored. Such a storage medium is, for example, a CD-ROM, a DVD, or a Blu-Ray disc. Alternatively, the storage medium is a USB stick or other memory that is, for example, rewritable or writable only once. Such a memory is, for example, a flash memory, a RAM, or a ROM.

The further developments and advantages explained in connection with the method are also to be applied mutatis mutandis to the motor vehicle/computer program product/storage medium and to each other, and vice versa.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
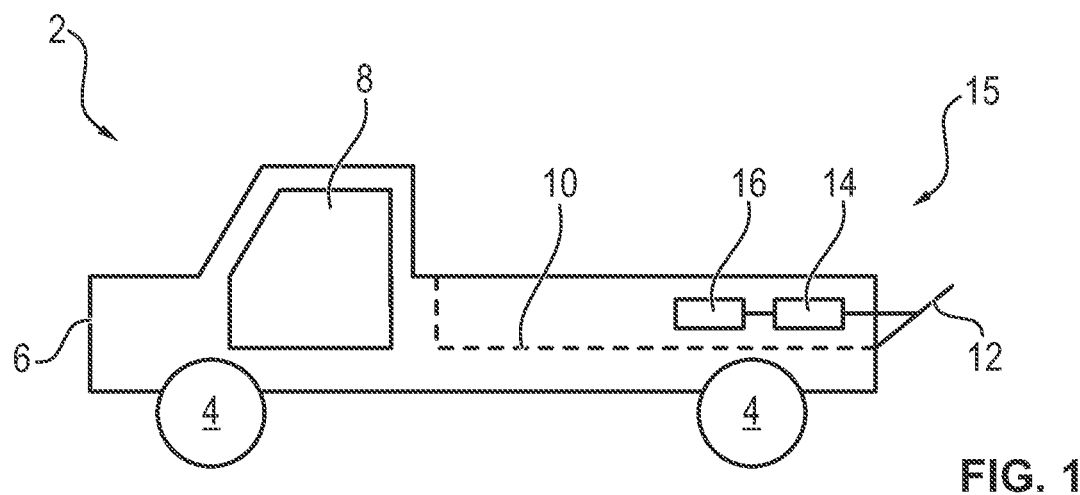
FIG. 1 schematically shows a motor vehicle with a tailgate driven by means of an electric motor.

FIG. 1 shows a schematic simplification of a motor vehicle 2 in the form of a pickup truck. The motor vehicle 2 has a number of wheels 4 by means of which contact is made with a road surface which is not shown. The wheels 4 are connected to a body 6 of the motor vehicle 2 via a chassis not shown in greater detail, by means of which a driver's cab 8 is formed at least in part. In the driver's cab 8 there is a driver's seat as well as further seats or benches, so that persons can travel with the motor vehicle 2 in the driver's cab 8.

By means of the body 6, a rectangular cargo area 10 is further formed at least partially, which area is horizontally oriented and adjoins the driver's cab 8 at the rear in the longitudinal direction (of the motor vehicle 2). With respect to the longitudinal direction, the cargo area 10 is surrounded both on the left and on the right by the body 6 by means of an overhang. At the rear end in the longitudinal direction, the cargo area 10 is bounded by means of a tailgate 12 which is pivotably mounted on the body 6 by means of hinges which are not shown in greater detail. It is possible to pivot the tailgate 12 from a horizontal to a vertical position (state).

In the horizontal state, i.e., in this position, of the tailgate 12, the cargo area 10 is completely surrounded on the circumference, so that objects located on the cargo area 10 cannot slip off the latter. When the tailgate 12 is pivoted to the horizontal position/state, it is aligned with the cargo area 10 so that unloading and loading of the cargo area 10 is facilitated. It is also possible to position objects on the cargo area 10 that protrude longitudinally beyond the cargo area 10 and are partially supported by means of the tailgate 10. If the tailgate 12 is too delicate for this purpose, or if components of the motor vehicle 2 located in the vertical direction below the tailgate 12 are still to be accessed, it is possible to disassemble the tailgate 12 and consequently remove it completely from the body 6 of the motor vehicle 2.

The tailgate 12 is driven by means of an electric motor 14, which is a brushless DC motor (BLDC). It is used to drive a roller, which is not shown in more detail, which is arranged in the horizontal direction and perpendicular to the longitudinal axis and which is attached to the tailgate 12 so that it cannot rotate. For this purpose, the roller has a gear wheel at the end, in which a further gear wheel driven by means of the electric motor 14 engages. An additional gear is preferably provided between the further gear wheel and the electric motor 14. Thus, the position of the tailgate 12 is adjusted by means of energizing the electric motor 14. The tailgate 12, the electric motor 14 and the components mechanically arranged therebetween, such as the roller, the gear wheels, and the gearbox, are part of a tailgate actuator 15.

Figure 2:
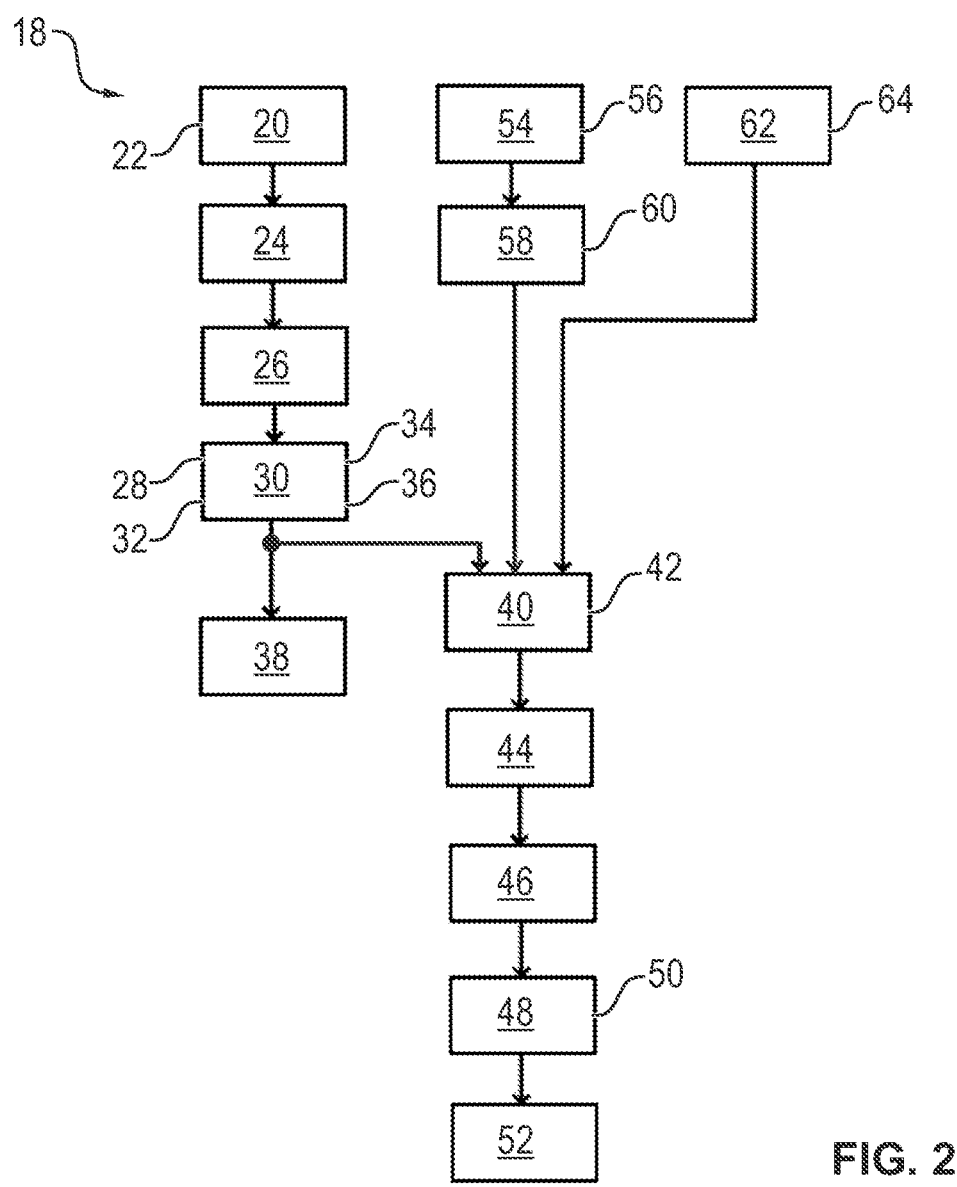
FIG. 2 shows a method for operating the tailgate.

The electric motor 14 is operated by means of a control unit 16 of the tailgate actuator 15, by means of which a current flow of the electric motor 14 is set. For this purpose, the control unit 16 comprises an application-specific circuit (ASIC), not shown in more detail, for carrying out a method 18 shown in FIG. 2, or a programmable microprocessor which carries out the method 18 when a computer program is executed. Regardless of how the control unit 16 is designed, it is used to operate the tailgate 12 in accordance with the method 18.

In a first step 20, an adjustment request 22 is detected. This is created, for example, by the user actuating a specific switch or performing a gesture, wherein the adjustment request 22 is detected by means of the switch or a sensor that detects the gesture. The adjustment request 22 comprises the request to adjust the tailgate 12, i.e., to pivot it. In this case, the tailgate 12 is to be moved to the open position, the closed position or another position depending on the respective adjustment request 22.

In a subsequent second step 24, it is checked whether the electric motor 14 is disabled. If this is the case, no current is supplied to the electric motor 14, and therefore the tailgate 12 is not pivoted by means of the electric motor 14. Subsequently, in particular, the method 18 is terminated.

If the electric motor 14 is not disabled, a third step 26 is performed in which the electric motor 14 is energized by means of the control unit 16. For energizing, a specific electrical voltage is applied to the electric motor 14 by means of the control unit 16 so that it rotates. In one embodiment, a PWM method is used for this purpose. The electric motor 14 is energized to adjust the tailgate 12 in accordance with the adjustment request 22, i.e., in the desired direction by means of the adjustment request 22. The electric motor 14 is thereby regulated to a desired rotational speed by means of the control unit 16, so that the electric motor 14 rotates at a certain rotational speed. As a result, a certain adjustment speed of the tailgate 12 results, provided that the tailgate actuator 15 functions properly.

When a time period 28 has elapsed, a fourth step 30 is performed. The time period 28 is measured in such a way that the tailgate 12 has been pivoted by 5° when the tailgate actuator 15 is functioning properly. In the fourth step 30, a value 32 characterizing the force applied by means of the electric motor 14 is detected. The characteristic value 32, which is also referred to as the detected value, is an electric current conducted by means of the electric motor 14, which results from the application of the electric voltage by means of the control unit 16.

The electrical current is also used here to determine whether an object is trapped between the tailgate 12 and the body 6 when the tailgate actuator 15 is operating properly. In other words, the electric current is already detected and used for anti-trap protection not shown in more detail. In this case, the electric current is additionally used as the characteristic value 32 and is compared with an expected value 34 which is permanently stored in the control unit 16. In an alternative to this, the expected value 34 is always recalculated depending on environmental parameters, environmental variables, or other requirements.

If the characteristic value 32 is greater than the expected value 34 or less than the expected value 34 up to a limit value 36, a fifth step 38 is performed. Thus, the fifth step 38 is performed when the force applied by means of the electric motor 14 is substantially equal to or less than the expected force up to a small value. In these cases, the tailgate 12 is driven without disturbance, with deviations from the expected value 34 occurring, for example, due to a slope of the motor vehicle 2 or deviating friction. In the fifth step 38, the tailgate 12 is driven further by means of the electric motor 14 until the position specified by means of the adjustment request 22 has been reached. Subsequently, the electric motor 14 is stopped and the method 18 is terminated.

If, on the other hand, the characteristic value 32 is less than the expected value 34 by the limit value 36, a sixth step 40 is performed. Thus, the sixth step 40 is performed when the force applied by means of the electric motor 14 is significantly less than the expected force required to move the tailgate 12. In the sixth step 40, a disassembled state 42 is detected. In the disassembled state 42, the tailgate 12 is either completely disengaged from the body 6 and removed therefrom so that the cargo area 10 is freely accessible. Alternatively, the tailgate 12 is still partially coupled to the body 6, but an adjustment of the tailgate 12 is no longer possible due to at least partial removal of the mechanical coupling. In other words, disassembly of the tailgate 12 has already begun. In this case, the disassembly has been carried out, for example, in a repair shop or by the user of the motor vehicle 2. Based on the sixth step 46, the disassembled state 42 is thus detected when the tailgate 12 has been disassembled or is being disassembled and, for example, the adjustment request 22 is erroneously generated by a user or other person.

When the disassembled state 42 is detected, a seventh step 44 is performed substantially immediately in which the electric motor 14 is disabled. If the electric motor 14 is still being energized, the energization is substantially immediately interrupted and the electric motor 14 is stopped. Also, further control of the electric motor 14 is no longer possible. If the adjustment request 22 was created erroneously while the tailgate 12 is disassembled, it is possible that extremities of the person performing the disassembly could be located between components of the tailgate actuator 15 that are moving relative to each other, which could thus be pinched and injured during further operation of the electric motor 14. This is therefore prevented by the locking mechanism. Even after disassembly of the tailgate 12, it is prevented that extremities or objects are trapped in any exposed areas of the adjustment drive 15 when an unintentional adjustment request 22 is detected.

In a subsequent eighth step 46, which is carried out when the disassembled state 42 is present, a rotation of the electric motor 14 is monitored by means of the control unit 16. For this purpose, a Hall sensor coupled to the electric motor 14 is evaluated. A rotation of the electric motor 14 may thereby result if the tailgate 12 is improperly removed and further parts of the tailgate actuator 15 are moved. It is also possible, during operation of the motor vehicle 2 when the tailgate 12 has been removed, that components of the tailgate actuator 15 are nevertheless moved and thus the electric motor 14 is at least partially rotated. If this is the case, subsequent unimpaired assembly of the tailgate 12 is no longer possible, or the position of the tailgate 12 must be adjusted to the current position of the electric motor 14.

In a subsequent ninth step 48, an assembly request 50 is detected. This is generated by a user, for example, by means of an input device not shown in more detail, such as a touchscreen. The assembly request 50 is generated by the user when the user wishes to reassemble the tailgate 12. After the assembly request 50 has been recorded, a tenth step 52 is carried out. In this step, the lock of the electric motor 14 is partially removed, and in this step, the electric motor 14 is rotated to the position that it was in at the beginning of the disassembled state 42. Following this, the electric motor 14 is again locked. Due to the turning back of the electric motor 14, it is thus always possible to insert and assemble the tailgate 12 in the same position, namely in the position in which the tailgate 12 was located during disassembly. This ensures reproducibility for the user.

The locking of the electric motor 14 is subsequently canceled in a further step when a corresponding setting is made by a user, for example on the input device, such as the touchscreen of an on-board computer. In this case, the user should not make this setting until the tailgate 12 is mechanically attached to the body 6.

The method 18 further comprises an eleventh step 54, which is performed independently of the first through fifth steps 20, 24, 26, 30, 38. In this step, a user input 56 is acquired. The user input 56 is created, for example, by means of a corresponding operation of the possible input device by the user, and the user input 56 is used to specify that the tailgate 12 is to be disassembled.

In a subsequent twelfth step 58, the electric motor 14 is energized by means of the control unit 16 in such a way that the tailgate 12 is brought into a disassembly position 60. For this purpose, the tailgate 12 is first brought into a half-open position so that it forms an angle of 45° with the horizontal. The tailgate is then moved again by 5° to the closed position. Due to such a movement, a mechanical locking of the tailgate 12 with the hinges is released, so that the tailgate 12 can be removed from the body 6. After the tailgate 12 has been moved to the disassembly position 60 by means of the electric motor 14, manual removal of the tailgate 12 is possible. Substantially immediately after completion of the twelfth step 58, the sixth step 40 is performed and thus the disassembled state 42 is detected.

The method 18 further comprises a thirteenth step 62, in which a manual adjustment of the tailgate 12 is detected. The detection is performed by means of the Hall sensor when the electric motor 14 is not energized by means of the control unit 16. The detected manual adjustment is compared with a preset 64. The preset 64 thereby corresponds to the adjustment of the tailgate 12 with the electric motor 14 in the twelfth step 58, i.e., moving the tailgate 12 into the half-open position and then pivoting it in the direction of the closed position by 5°. Consequently, when the tailgate 12 is pivoted according to the preset 64, the mechanical locking/coupling of the tailgate 12 with the body 6 is removed.

Following this, the sixth step 40 is also carried out and thus the disassembled state 42 is detected. If, on the other hand, the manual adjustment does not correspond to the preset 64, the tailgate 12 is merely pivoted manually into a desired position, and the method 18 is terminated.

For example, in a variant of the method 18 not shown in detail, the first through fifth steps 20, 24, 26, 30, 38 or the eleventh step 54 or the thirteenth step 62 are not present.

The invention is not limited to the exemplary embodiment described above. Rather, other variants of the invention can also be derived therefrom by the person skilled in the art without departing from the object of the invention. Furthermore, in particular, all individual features described in connection with the exemplary embodiment can also be combined with each other in other ways without departing from the object of the invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for operating a tailgate of a motor vehicle, in particular a pickup, the method comprising:
    driving, via an electric motor, the tailgate, which delimits a cargo area;
    detecting a disassembled state; and
    inhibiting a current supply of the electric motor.

2. The method according to claim 1, wherein the electric motor is energized for adjustment in accordance with a detected adjustment request, and a value characterizing the force applied by means of the electric motor is detected and compared with an expected value, and wherein the disassembled state is detected in the event of a deviation greater than a limit value.

3. The method according to claim 2, wherein an electric current conducted via the electric motor is used as the value characterizing the force applied via the electric motor.

4. The method according to claim 2, wherein the comparison is carried out after a certain time period after the start of the energization of the electric motor.

5. The method according to claim 1, wherein the disassembled state is detected when a manual adjustment of the tailgate is detected in accordance with a specific preset.

6. The method according to claim 1, wherein the disassembled state is detected after a user input has been recorded.

7. The method according to claim 6, wherein, after recording the user input, the electric motor is first energized to bring the tailgate into a disassembly position and then the disassembled state is detected.

8. The method according to claim 1, wherein, in the disassembled state, a rotation of the electric motor is monitored, and, after detection of an assembly request, the electric motor is energized to assume the position at the start of the disassembled state.

9. A motor vehicle, in particular pickup truck, comprising:
an electric motor
a tailgate that is driven via an electric motor, the tailgate delimiting a cargo area and is operated in accordance with the method according to claim 1.

* * * * *

UNITED STATES PATENT AND TRADEMARK OFFICE
CERTIFICATE OF CORRECTION

| | | |
|---|---|---|
| PATENT NO. | : 12,015,263 B2 | Page 1 of 1 |
| APPLICATION NO. | : 17/575287 | |
| DATED | : June 18, 2024 | |
| INVENTOR(S) | : Heino Schalyo | |

It is certified that error appears in the above-identified patent and that said Letters Patent is hereby corrected as shown below:

On the Title Page

Item (73), please replace "Volkswagen Aktiengesellschaft, Wolfsburg, Germany" with "Brose Fahrzeugteile SE & Co. Kommanditgesellschaft, Bamberg, Bamberg, Germany"

Signed and Sealed this
Twenty-third Day of September, 2025

John A. Squires
*Director of the United States Patent and Trademark Office*